US008540522B2

(12) United States Patent
Davis et al.

(10) Patent No.: US 8,540,522 B2

(45) Date of Patent: Sep. 24, 2013

(54) UTILITY CONTROL SYSTEM AND METHOD

(75) Inventors: Gregory Davis, Maynardville, TN (US); Moshe Shloush, Knoxville, TN (US)

(73) Assignee: Lumetric Lighting, Inc., Oak Ridge, TN (US)

( * ) Notice: Subject to any disclaimer, the term of this patent is extended or adjusted under 35 U.S.C. 154(b) by 249 days.

(21) Appl. No.: 13/007,531

(22) Filed: Jan. 14, 2011

(65) Prior Publication Data

US 2012/0081024 A1 Apr. 5, 2012

Related U.S. Application Data

(60) Provisional application No. 61/390,161, filed on Oct. 5, 2010.

(51) Int. Cl.
*H02B 1/056* (2006.01)
*H05B 41/16* (2006.01)

(52) U.S. Cl.
USPC ........... 439/43; 439/55; 439/56; 315/209 SC; 315/291; 315/307

(58) Field of Classification Search
USPC ......... 315/209 SC, 291, 307, DIG. 4, DIG. 5; 439/43, 55, 56
See application file for complete search history.

(56) References Cited

U.S. PATENT DOCUMENTS

| | | | |
|---|---|---|---|
| 6,107,755 A | 8/2000 | Katyl et al. | |
| 6,388,396 B1 | 5/2002 | Katyl et al. | |
| 6,867,554 B2 | 3/2005 | Ribarich et al. | |
| 7,042,173 B2 | 5/2006 | Huber | |
| 7,307,433 B2 | 12/2007 | Miller et al. | |
| 7,312,586 B2 | 12/2007 | Montante | |
| 7,375,476 B2 | 5/2008 | Walter et al. | |
| 2005/0218839 A1 | 10/2005 | Ribarich | |
| 2006/0178792 A1 | 8/2006 | Ortiz et al. | |
| 2007/0285027 A1* | 12/2007 | Gehman | 315/209 SC |
| 2008/0130673 A1* | 6/2008 | Cregg et al. | 370/432 |
| 2010/0301781 A1* | 12/2010 | Budike, Jr. | 315/362 |

OTHER PUBLICATIONS

International Search Report and Written Opinion dated Mar. 13, 2012 for PCT Application No. PCT/US2011/054517.

* cited by examiner

*Primary Examiner* — Douglas W Owens
*Assistant Examiner* — Thai Pham
(74) *Attorney, Agent, or Firm* — The Mueller Law Office, P.C.

(57) ABSTRACT

Embodiments of the present invention provide for the control of a powered utility. A circuit board, an onboard controller located on the circuit board, and a daughterboard connector also located on the circuit board are utilized. The onboard controller is configured to provide a first level of control functionality to the system. The first level of control functionality includes the ability to transfer the powered utility between an operating state and an off state. The daughterboard connector is configured to accept a daughterboard, and that daughterboard is configured to increase the control functionality of the system above the first level of control functionality to a second level of control functionality.

20 Claims, 2 Drawing Sheets

UTILITY CONTROL SYSTEM AND METHOD

CROSS-REFERENCE TO RELATED APPLICATIONS

This patent application claims the benefit of U.S. Provisional Patent No. 61/390,161 filed Oct. 5, 2010. The content of U.S. Provisional Patent No. 61/390,161 is incorporated by reference in its entirety herein as if it were put forth in full below.

FIELD OF THE INVENTION

The invention relates generally to the control of powered utilities, and more specifically to the efficient production of customizable control systems for powered utilities.

BACKGROUND OF THE INVENTION

Powered utilities are incorporated into the design of nearly every modern facility and therein provide a broad spectrum of functionality. To varying degrees the design of HVAC systems, lighting systems, alarm systems, communication systems, surveillance systems, and various other utilities has been conducted concurrently with the design of a facility from inception to completion for quite some time. However, modern utility systems often offer a staggering degree of functionality to their users as compared to simpler systems. For example, some modern utility systems include the ability to access the system through a digital control network. As these systems have increased in complexity and functionality, the need for advanced intelligent control systems has increased as well. These utility networks often include control systems implemented through the use of electronic microcontrollers embedded in the powered utility devices themselves.

The addition of a microcontroller to powered utilities opens up an entirely new level of potential functionality to a utility network. Microcontrollers are usually embedded on a printed circuit board in one of the final steps of the circuit board's assembly. This final step is fittingly referred to as printed circuit board assembly. In this step, one or more microcontrollers are connected to the circuit board. Microcontrollers are often connected through the use of solder material meant to provide structural support to the connection. Although a single main microcontroller will handle generalized control of the powered utility, various other microcontrollers can be added to handle auxiliary tasks such as providing a timer, managing bias circuitry, providing communication capabilities, and any other task that the powered utility must handle that requires built-in intelligence.

Given the wide range of functions that are available for certain powered utilities, the control systems on these utilities must necessarily be quite complex. Control systems that can provide this degree of functionality are therefore necessarily much more expensive as compared to control systems providing the minimum degree of functionality necessary to keep the utility in a standard operating state. However, not all customers deploying a powered utility system will require the same degree of functionality. One customer may only want a lighting system that can provide sufficient power to the lamp when light is desired while another may want a lighting system that dims, responds to motion sensors, takes commands from a digital network, and performs numerous other functions. In addition, these complex control systems can sometimes be spread out onto auxiliary boards that may make the overall assembly process more complex.

Approaches that split the control of a powered utility between elements on the main circuit board and one or more daughterboards address the problems described above. The term "daughterboard" is used because common terminology refers to the main circuit board in a system using the term "motherboard". The term daughterboard is used to refer to a circuit board in a system which is separate from the main circuit board. Approaches using multiple circuit boards are focused on reducing the cost of creating a single system to function with variant powered utilities. For example, a control system that could potentially be connected to multiple kinds of lamps may implement the final power-providing stage on a daughterboard. The benefit of this type of system is that the same main controller and circuit board can be used for multiple lamps, while a particular lamp's characteristics will determine the daughterboard that can serve as said final stage. This approach could allow the same main controller and printed circuit board to be used with different types of lamps such as fluorescent, incandescent, or high intensity discharge lamps. Other related approaches are focused on the optimization of card assembly operations. For example, a microcontroller that is either the main controller or that provides some auxiliary functionality for a lighting device may require a different form of assembly operation as compared to the rest of the circuit board. Therefore, the main circuit board will undergo a first printed circuit board assembly process, and the additional circuitry will be added through different means after the initial assembly is complete.

SUMMARY OF INVENTION

In one embodiment of the invention, a system for controlling a powered utility is disclosed. The system comprises a circuit board, an onboard controller located on the circuit board, and a daughterboard connector also located on the circuit board. The onboard controller is configured to provide a first level of control functionality to the system. The first level of control functionality includes the ability to transfer the powered utility between an operating state and an off state. The daughterboard connector is configured to accept a daughterboard from a set of compatible daughterboards that are each configured to increase the control functionality of the system above the first level of control functionality to a second level of control functionality.

In another embodiment of the invention, a method for manufacturing a control system for a powered utility is disclosed. In one step, a circuit board is assembled to form a baseline control system. In another step, a daughterboard is attached to the circuit board after the assembly step is complete. The baseline control system is capable of maintaining the powered utility in a standard operating state. The daughterboard is configured to increase the level of control functionality for the control system.

In another embodiment of the invention, a method for providing control to a powered utility is disclosed. In one step, a powered utility is controlled using a daughterboard connected to a daughterboard connector located on a circuit board. The circuit board also has an onboard controller. The onboard controller is configured to provide a first level of control functionality to the system including the ability to transfer the powered utility between a standard operating state and an off state. The daughterboard is configured to increase the control functionality above the first level of control functionality to a second level of control functionality.

DETAILED DESCRIPTION OF THE PREFERRED EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers all such modifications and variations within the scope of the appended claims and their equivalents.

Due to the proliferation of functionality provided by powered utilities, control systems for these devices have greatly increased in functionality. A single control system produced by a vendor will therefore almost never satisfy all the vendor's potential customers since each customer will have different opinions as to which functions are valuable and necessary. One solution could be to include every potential function on a control system and only activate those features that a customer desires. However, the control system is often the most costly portion of the overall powered utility system, and the elimination of functionality often leads to significant cost savings.

Embodiments of the present invention allow for the cost effective production of customized utility control systems. Specific embodiments of the invention consist of a baseline control system which is connected to a circuit board, and an additional control system that provides a higher level of functionality instantiated on a daughterboard. A baseline control system is one that is capable of providing a minimum level of functionality associated with a given utility. For example, a baseline control system for a lighting system could be able to hold the lighting system in a standard operating state to produce light. In specific embodiments of the invention, the higher level of control functionality includes the ability to communicate with other similar devices. In specific embodiments of the invention, the baseline control system and circuit board are very low cost, and the daughterboard houses the more expensive and complex control systems desired by particular customers. A set of compatible daughterboards can be designed to meet the various desires of potential customers. In this way, a vendor is able to offer a wide spectrum of functionality options to their customers while minimizing the overall cost of producing a line of systems that provide those functionality options.

Figure 1:
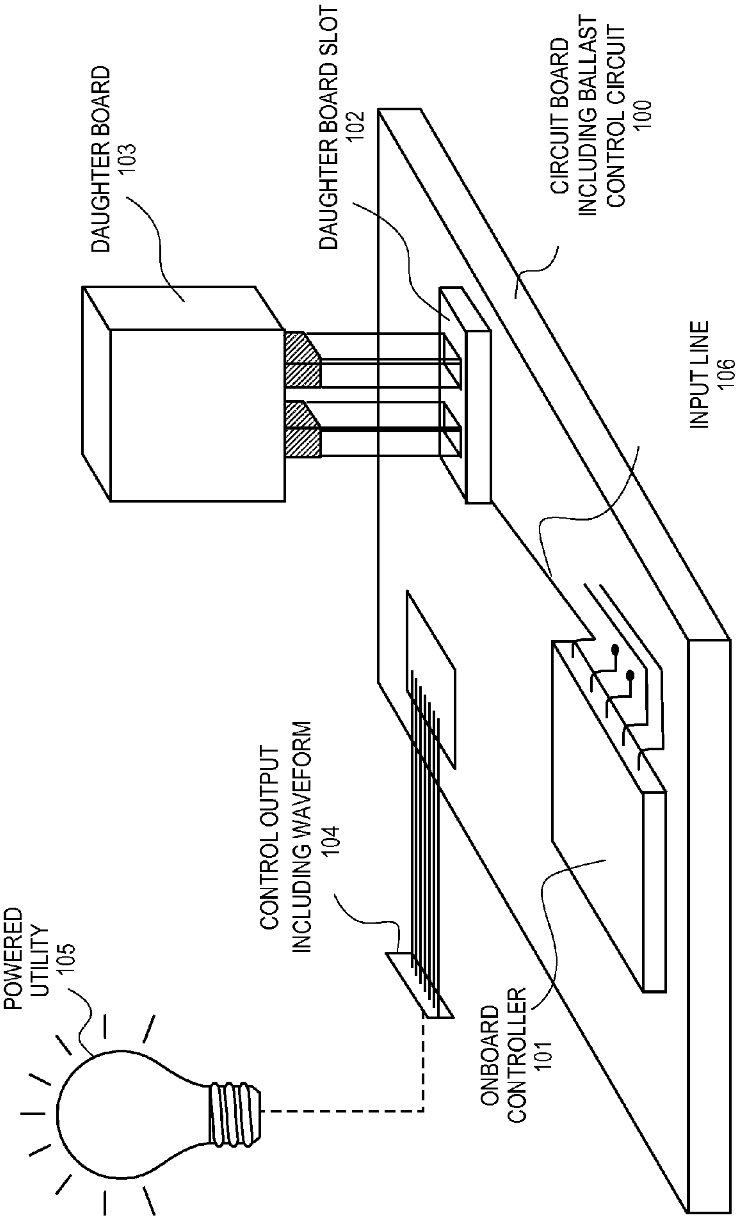
FIG. 1 illustrates a system for controlling a powered utility that is in accordance with the present invention.

A specific embodiment of the present invention can be described with reference to FIG. 1. FIG. 1 displays a system for controlling a powered utility comprising circuit board 100, an onboard controller 101, a daughterboard connector such as slot 102, and a daughterboard 103. Onboard controller 101 is located on circuit board 100. Daughterboard connector 102 is also located on circuit board 100 and it is configured to accept any daughterboard from a set of compatible daughterboards. In this embodiment, daughterboard connector 102 is a shown as a slot, but any other connecting method may be utilized. Examples of such methods are discussed below with reference to FIG. 2.

Onboard controller 101 is configured to provide a first level of control functionality to the system. Control functionality refers to any function provided by an element in a system whose instructions as to that function are not subject to the instructions of another element in the same system. The aforementioned first level of control functionality includes the ability to transfer the controlled powered utility between an operating state and an off state. In the specific embodiment shown illustrated in FIG. 1, control functionality is provided through use of control output 104. Control output 104 is illustrated as a wired connection, but it could be implemented using any form of communicative connection including a wireless connection. In this specific embodiment, powered utility 105 is represented by a lighting device, but any other utility may be connected such as an HVAC device, a power routing device, an alarm device, a communication device, or a surveillance device. Although the figure shows powered utility 105 as separate from circuit board 100, a powered utility in accordance with the present invention may have a circuit board such as circuit board 100 embedded within the utility itself. The first level of control functionality in this situation would include the ability to turn the light on and off. As such, onboard controller 101 can be implemented with a single mechanical switch. However, onboard controller 101 can also be a highly complex controller and the first level of functionality can include control of far more complex functionalities.

In specific embodiments of the invention, the first level of control functionality provided by onboard controller 101 will consist of a baseline control system functionality. This baseline control system functionality will include all control operations necessary to keep the powered utility in a standard operating state. Therefore, in these embodiments the powered utility would be able to function normally without daughterboard 103 being connected to daughterboard connector 102. For example, if powered utility 105 were a high-intensity discharge lamp, this baseline control system functionality would include the production of control signals necessary to operate the ballast providing power to the lamp and any other control signals necessary to keep the lamp lit. As another example, if powered utility 105 were a video camera surveillance system, this baseline control system functionality would include the production of control signals necessary to capture images and transmit them to a useful medium.

Daughterboard 103 is a daughterboard from the aforementioned set of compatible daughterboards. The daughterboard is configured to increase the control functionality of the system above the first level of control functionality provided by onboard controller 101 to a second level of control functionality. Building upon the above mentioned example, the first level of functionality consists of the ability to turn a lighting device on and off, and the second level of functionality provided by daughterboard 103 comprises the ability to dim the lighting device. Daughterboard 103 can be configured to provide any potential combination of desired control functionalities so long as such functionalities represent an increase in the overall level of control functionality provided to the system. For example, this second level of control functionality could include the ability to communicate digitally with other powered utilities. As another example, if powered utility 105 was a lighting device this additional level of functionality could include the ability to start the lighting device using one of a set of variant ignition pulses.

In specific embodiments of the invention, daughterboard controller 103 will at least partially supplant onboard controller 101 when it is connected to daughterboard connector 102. In such a case there may be some control functionality provided by onboard controller 101 that will be shutdown or be set subservient to control functionality provided by daughterboard 103. For example, onboard controller 101 may control image processing on a surveillance camera, while daughterboard 103 has the same capabilities but can execute image processing in a much more refined manner. In that case, daughterboard 103 may take over image processing when it is connected. Supplanting control functionality does not always mean that the operations previously conducted by onboard controller 101 will be terminated. In specific embodiments, onboard controller 101 will continue to execute its operations, but they will become subservient to the control functionality of daughterboard 103.

In specific embodiments of the invention, daughterboard controller 103 will fully supplant onboard controller 101 when it is connected to daughterboard connector 102. In such cases all control functionality provided by onboard controller 101 will be shutdown or be set subservient to control functionality provided by daughterboard 103. In these embodiments onboard controller 101 will be a slave of daughterboard 103 in regard to all aspects of its operations. As in the case where daughterboard controller 103 at least partially supplants onboard controller 101, not all the operations previously conducted by onboard controller 101 will be terminated. They will however all be set subservient to the control functionality of daughterboard controller 103. In specific embodiments of the invention, onboard controller 101 will continue to function as a simple input/output device for circuit board 100.

Input line 106 is configured to sense if daughterboard 103 is connected to daughterboard connector 102. In specific embodiments, onboard controller 101 will relinquish control of certain control functionalities when input line 106 senses that daughterboard 103 is connected to daughterboard connector 102. For example, onboard controller 101 may control a waveform provided by a ballast to a lamp when said powered utility is a lighting device. However, when input line 106 detects that daughterboard 103 is connected, onboard controller 101 may turn over control of the waveform to daughterboard 103. Although input line 106 is drawn connected to onboard controller 101, circuit board 100 may be configured such that onboard controller 101 does not need to be provided with information from input line 106 in order for daughterboard 103 to at least partially supplant onboard controller 101.

Figure 2:
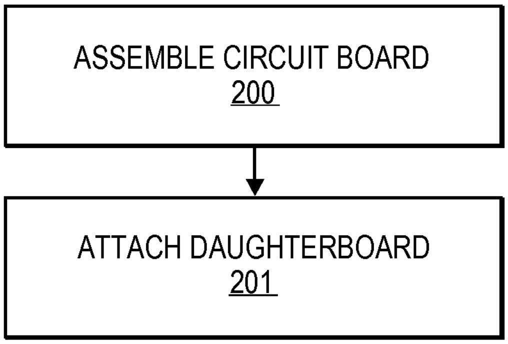
FIG. 2 illustrates a process flow chart of a method for manufacturing a system for controlling a powered utility that is in accordance with the present invention.

Another specific embodiment of the present invention can be described with reference to FIG. 2. FIG. 2 illustrates a method of manufacturing a control system for a powered utility. In step 200, a circuit board is assembled to form a baseline control system. In specific embodiments, step 200 is executed using printed circuit board assembly. Integrated circuits may be connected to the circuit board using solder or mechanical connections. The baseline control system that is assembled in step 200 is capable of maintaining said powered utility in a standard operating state and is configured to attach to a daughterboard. Examples of a standard operating state are provided above in reference to FIG. 1. In step 201, a daughterboard is attached to the circuit board. In specific embodiments, this step is conducted after printed circuit board assembly is complete. The daughterboard is configured to increase a level of control functionality of the control system. Examples of increasing a level of control functionality of a control system are provided above in reference to FIG. 1.

Step 201 could include attaching the daughterboard using a standard peripheral socket. The socket would provide a majority of a required support to the daughterboard through a mechanical connection. In such embodiments, solder would not be required to assure the daughterboard was reliably connected to the circuit board. In other embodiments step 201 can be executed using any form of after-market connection such as a mechanical socket, a standard computer card socket, a USB connection, or a wired plug connection.

Figure 3:
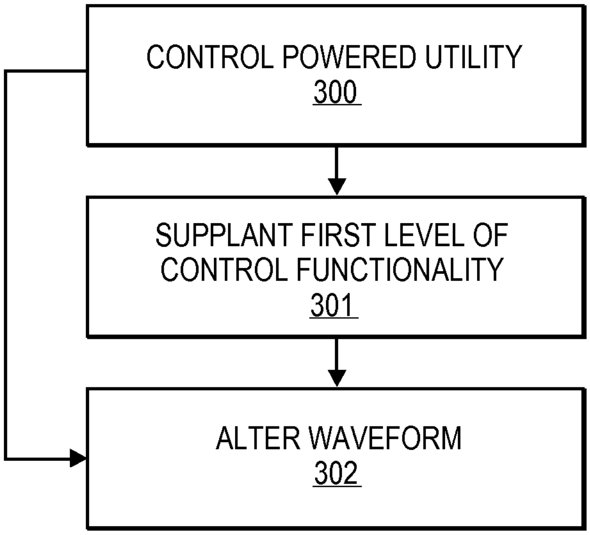
FIG. 3 illustrates a process flow chart of a method for controlling a powered utility that is in accordance with the present invention.

Another specific embodiment of the present invention can be described with reference to FIG. 3. FIG. 3 illustrates a method for providing control to a powered utility. In step 300, a control system located on a circuit board is activated. The circuit board comprises an onboard controller configured to provide a first level of control functionality to the powered utility. The first level of control functionality includes the ability to transfer the powered utility between a standard operating state and an off state.

In step 301, a second level of control functionality is provided to the powered utility using a daughterboard. The daughterboard is connected to a daughterboard connector located on the circuit board. The daughterboard is configured to increase the system's control functionality above the first level of control functionality to the second level of control functionality when connected to the daughterboard connector. The manner in which the daughterboard is connected to the circuit board is described above with reference to FIG. 2. The relationship between the first and second level of control functionality are described above with reference to FIG. 1.

In specific embodiments of the invention, the first level of control functionality consists of a baseline control system functionality. In specific embodiments of the invention wherein the powered utility comprises a lighting device, the second level of functionality includes the ability to ignite a lamp using one of a set of variant ignition pulses. This division can be useful given that variant ignition pulses are required to variant types of lamps. As such, the same main board can be used for various lamps and the baseline board can be configured to provide a pulse that will start almost all lamps even if it is not optimal for all of the lamps it may be used with.

In step 302, the onboard controller is repressed at least partially by the daughterboard. In specific embodiments, the daughterboard will fully repress the control functionalities provided by the onboard controller such that the daughterboard independently controls the system and the onboard controller is a slave to the daughterboard. In other specific embodiments, the daughterboard will only partially repress the onboard controller such that said onboard process retains some degree of control functionality. This step is optional given that in other embodiments of the invention, the daughterboard and on board processor each retain control functionality over separate elements of the system's operation such that the daughterboard adds to and does not diminish any of the original functionalities provided by the onboard controller.

In specific embodiments of the invention wherein the powered utility is a high intensity discharge lamp requiring a control waveform, the control waveform is adjusted by the onboard processor or the daughterboard in step 303. Altering the characteristic of a control waveform provided to a lighting device can act to dim the device. Therefore, the ability to dim the lighting device can in some embodiments be retained by the onboard controller, and in other embodiments be controlled by the daughterboard. Step 303, can be conducted in tandem with systems having onboard controllers that are capable of dimming the lamp, in which case the daughterboard takes over this responsibility and perhaps enhances the light's dimming capability. Step 303, can also be conducted in tandem with systems having onboard controllers that are not capable of dimming the lamp, in which case the daughterboard will provide dimming capabilities to a system that could not otherwise be dimmed.

Although embodiments of the invention have been discussed primarily with respect to specific embodiments thereof, other variations are possible. Various configurations of the described system may be used in place of, or in addition to, the configurations presented herein. For example, although the onboard controller was generally referred to as if it were a microcontroller it could also be implemented using logic built into the circuit board or be as simple as a single analog switch. Also, the onboard controller and daughterboard could be multi-part systems. For example, the onboard controller could be a group of integrated circuits working in combination. In addition, the daughterboard was often described as if it contained a microcontroller but it could also be as simple as an attachment that couples in a mechanical switch to the system or some other form of simple control system. Also, the invention could be applied to a control system that controlled a network of powered utilities. As used throughout this specification and in the appended claims the term "set" may be used to describe a set consisting of a single element.

Those skilled in the art will appreciate that the foregoing description is by way of example only, and is not intended to limit the invention. Nothing in the disclosure should indicate that the invention is limited to systems that require power from a main grid. Neither should anything in the disclosure limit the scope of the invention to electronics or communication through the use of charged particles or electro-magnetic waves as any type of control system can benefit from the teachings herein. Functions may be performed by hardware or software, as desired. In general, any diagrams presented are only intended to indicate one possible configuration, and many variations are possible. Those skilled in the art will also appreciate that methods and systems consistent with the present invention are suitable for use in a wide range of applications encompassing any related to powered utility systems.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A system for controlling a powered utility comprising:

a circuit board;

an onboard controller located on said circuit board, said onboard controller being configured to provide a first level of control functionality to said system; and a daughterboard connector located on said circuit board, said daughterboard connector being configured to accept a daughterboard from a set of compatible daughterboards;

wherein said first level of control functionality includes the ability to transfer said powered utility between an operating state and an off state;

wherein each daughterboard in said set of compatible daughterboards is configured to increase said control functionality above said first level of control functionality to a second level of control functionality; and wherein said daughterboard will at least partially repress the control functionalities provided by said onboard controller and independently control said system.

2. The system from claim 1, wherein said system is configured to at least partially supplant said onboard controller with a daughterboard when said daughterboard is connected to said daughterboard connector.

3. The system from claim 1, wherein said second level of functionality includes the ability to communicate digitally with other powered utilities.

4. The system from claim 1, wherein said first level of control functionality consists of a baseline control system functionality.

5. The system from claim 1, further comprising:

a lamp;

wherein said second level of functionality includes the ability to ignite said lamp using one of a set of variant ignition pulses.

6. The system from claim 1, wherein:

said powered utility is a lighting device; and said second level of functionality includes the ability to dim said lighting device.

7. The system from claim 6, further comprising:

a lamp receiving a power supply from a ballast;

a ballast control circuit located on said circuit board, said ballast control circuit controlling a waveform provided by said ballast to said lamp; and an input line configured to sense if said daughterboard is connected to said daughterboard connector;

wherein said onboard controller is configured to control a waveform provided by said ballast to said lamp; and wherein said onboard controller is configured to relinquish control of said ballast control circuit to said daughterboard when said input line senses said daughterboard is connected to said daughterboard connector.

8. A method of manufacturing a control system for a powered utility comprising the steps of:

assembling a circuit board to form a baseline control system;

wherein said circuit board is configured to connect to a daughterboard;

wherein said baseline control system can maintain said powered utility in a standard operating state;

wherein said daughterboard is configured to increase a level of control functionality of said control system; and wherein said daughterboard will at least partially repress the control functionalities provided by said control system and independently control said system.

9. The method of claim 8, further comprising the step of attaching said daughterboard to said circuit board after said assembling is complete.

10. The method of claim 9, wherein the step of attaching said daughterboard to said circuit board after said assembling is complete is via a mechanical socket, a standard computer card socket, a USB connection, or a wired plug connection.

11. The method of claim 10, wherein said daughterboard at least partially supplants a control functionality provided by said baseline control system.

12. The method of claim 10, wherein said powered utility is a lighting device.

13. The method from claim 12, wherein said daughterboard increases said level of control functionality by providing the ability to dim said lighting device.

14. A method for controlling a powered utility comprising:

activating a control system located on a circuit board, said circuit board comprising an onboard controller configured to provide a first level of control functionality to said powered utility;

providing a second level of control functionality to said powered utility using a daughterboard, said daughterboard connected to a daughterboard connector located on said circuit board;

wherein said first level of control functionality includes the ability to transfer said powered utility between a standard operating state and an off state;

wherein said daughterboard is configured to increase said control functionality above said first level of control functionality to said second level of control functionality when connected to said daughterboard connector; and wherein said daughterboard will at least partially repress the control functionalities provided by said onboard controller and independently control said system.

15. The method from claim 14, further comprising the step of repressing said onboard controller at least partially with said daughterboard.

16. The method from claim 14, wherein said second level of functionality includes the ability to communicate digitally with other powered utilities.

17. The method from claim 14, wherein said first level of control functionality consists of a baseline control system functionality.

18. The method from claim 17, wherein:

said powered utility comprises a lamp; and said second level of functionality includes the ability to ignite said lamp using one of a set of variant ignition pulses.

19. The method from claim 14, wherein:

said powered utility is a lighting device; and said second level of functionality includes the ability to dim said lighting device.

20. The method from claim 19, further comprising the step of:

altering a waveform provided by a ballast to a lamp receiving power from said ballast;

wherein said onboard controller is configured to execute said altering when said daughterboard is not connected to said connector, and wherein said daughterboard is configured to execute said altering when said daughterboard is connected to said connector.

* * * * *